United States Patent
Dingle (10) Patent No.: US 12,039,502 B2
(45) Date of Patent: Jul. 16, 2024

(54) SYSTEM, METHOD AND SERVICES FOR TRACKING, MONITORING AND TRANSPORTING

(71) Applicant: Artheia E. Dingle, Largo, MD (US)

(72) Inventor: Artheia E. Dingle, Largo, MD (US)

( * ) Notice: Subject to any disclaimer, the term of this patent is extended or adjusted under 35 U.S.C. 154(b) by 135 days.

(21) Appl. No.: 17/700,430

(22) Filed: Mar. 21, 2022

(65) Prior Publication Data

US 2022/0300914 A1    Sep. 22, 2022

Related U.S. Application Data

(60) Provisional application No. 63/163,824, filed on Mar. 20, 2021.

(51) Int. Cl.
| | |
|---|---|
| *G06Q 10/20* | (2023.01) |
| *G06Q 50/40* | (2024.01) |
| *H04W 4/029* | (2018.01) |

(52) U.S. Cl.
CPC ............ *G06Q 10/20* (2013.01); *G06Q 50/40* (2024.01); *H04W 4/029* (2018.02)

(58) Field of Classification Search
CPC ........ G06Q 10/20; G06Q 50/30; H04W 4/029
See application file for complete search history.

(56) References Cited

U.S. PATENT DOCUMENTS

| | | | | |
|---|---|---|---|---|
| 8,219,263 B2 * | 7/2012 | Takeda | ................. | H04W 4/029 |
| | | | | 701/1 |
| 10,124,234 B2 * | 11/2018 | Martin | ................. | G06Q 10/20 |
| 2015/0379480 A1 * | 12/2015 | Taplan | ................. | G06Q 10/00 |
| | | | | 705/7.13 |
| 2016/0196701 A1 * | 7/2016 | Strother | ................. | G06Q 10/06 |
| | | | | 701/29.3 |
| 2018/0352081 A1 * | 12/2018 | Self | ................. | H04L 12/1895 |
| 2023/0377455 A1 * | 11/2023 | Karapantelakis | .... | G08G 1/0116 |

FOREIGN PATENT DOCUMENTS

| | | | | | |
|---|---|---|---|---|---|
| CN | 105015665 | A | * | 11/2015 | |
| CN | 210364197 | U | * | 4/2020 | |
| CN | 113748316 | B | * | 1/2024 | ............ B60W 50/04 |
| CN | 117671981 | A | * | 3/2024 | |
| DE | 102014210780 | A1 | * | 12/2015 | ............ G06Q 10/00 |
| EP | 2953067 | A1 | * | 12/2015 | ............ G06Q 10/00 |
| KR | 20180113684 | A | * | 10/2018 | ............ G06Q 50/30 |

(Continued)

OTHER PUBLICATIONS

Wilson, Carla "North Cowichan man finds stolen dirt bike by flying drone" Time Colonist, Feb. 11, 2016, https://www.timescolonist.com/local-news/video-north-cowichan-man-finds-stolen-dirt-bike-by-flying-drone-4632037 (Year: 2016).*

(Continued)

*Primary Examiner* — Gerardo Araque, Jr.
(74) *Attorney, Agent, or Firm* — DOSTER GREENE, LLC (57) ABSTRACT

A system according to various embodiments can monitor, track, and pair one or more cyclist devices and bike devices, detect cyclist accidents and severity of the impact, and accommodate cyclists and bikes of a transportation and repair arrangement service. The system can pair a cyclist device with a bike device to track accident detection, damage bike detection, and bike theft detection.

7 Claims, 8 Drawing Sheets

(56) References Cited

FOREIGN PATENT DOCUMENTS

KR            20190074636 A    *    6/2019             G06Q 50/30

OTHER PUBLICATIONS

On-Star "On Star Bicycle—Find the world beyond the pavement" On-Star, Sep. 18, 2020, https://www.onstar.com/stories/onstar-biking-find-new-paths (Year: 2020).*

Eadicicco, Lisa "How DJI's New Drone is Able to Track Your Movement", Time, Mar. 1, 2016, https://time.com/4243394/dji-phantom-4-activetrack/ (Year: 2016).*

BetterWorldClub "Bicycle Roadside Assistance" Archive Date Dec. 4, 2020, https://web.archive.org/web/20201204071255/https://www.betterworldclub.net/nationwide-bike-roadside-assistance (Year: 2020).*

Baynes, Chris "Police drone finds missing man stuck in Norfolk marshes" Independent, Jun. 19, 2018, https://www.independent.co.uk/news/uk/home-news/norfolk-missing-man-drone-police-drone-stuck-marshes-titchwell-brancaster-peter-pugh-a8406821.html (Year: 2018).*

Mercanti, Saris "The Bike Spike, Onstar for Bicycles" BikeRumor!, Mar. 19, 2013, https://bikerumor.com/the-bike-spike-onstar-for-bicycles/ (Year: 2013).*

Anonymous "Road Side Assistance and Towing. [Tender documents : T36872962]," MENA Report, pp. n/a, 2016 (Year: 2016).*

A. Scott, "Say, can I hitch a ride?" Orange County Register, pp. n/a, 2011 (Year: 2011).*

C. Klingbeil, "Stranded cyclists can now use AMA membership to get help," Edmonton Journal, pp. A.1, 2012 (Year: 2012).*

* cited by examiner

SYSTEM, METHOD AND SERVICES FOR TRACKING, MONITORING AND TRANSPORTING

CROSS REFERENCE TO RELATED APPLICATIONS

This application claims benefit to U.S. Provisional Patent Application No. 63/163,824, filed Mar. 20, 2021, which is incorporated by reference herein in its entirety.

FIELD OF THE INVENTION

The present teachings relate generally to a system, method and services for tracking, monitoring and pairing cyclists and their bikes. More particularly, a system can monitor, track, and pair one or more cyclist devices and bike devices, detect cyclists accidents and severity of the impact, and accommodate cyclists and bikes of a transportation and repair arrangement service.

BACKGROUND

Cyclists can often experience fatigue or bike mechanical complications during their bike rides. However, most of the current taxi cabs and ride hailing services do not offer services for passengers with bicycles, Many bicycle clubs and meetup groups do not offer support and gear (SAG) services for bike races and cycling events, which can often leave some bicyclists alone and stranded on dangerous roads and trails.

Whether a cyclist spends time riding on the road, in the mountain or in competition, the cyclist, at some point in his rides, may crash his bike. The cyclist may even be involved in an accident with a car. In a serious accident, the cyclist may suffer injuries or become unconscious so that the cyclist may be unable to contact someone. The cyclist may be in an area without cell coverage from any service provider so that the cyclist's cell phone becomes ineffective. Therefore, a location and beacon service that can locate the missing cyclist and the bike is needed.

Thus, it is desirable to offer a system that provides a bicycle hailing service and mobile bike repair shop. It is also desirable to provide a system capable of offering location services to find a cyclist, for example, that may be injured or missing. In addition, a system is needed that is capable of locating a missing or stolen bicycle. Following a crash, the system may be able to locate the cyclist. If the cyclist cannot be located, the system can locate the bike which can then help to determine the vicinity of the missing cyclist. If the cyclist is riding on back roads or rural road cycling, the system can help to identify the vicinity of the cyclist and/or the bike on such back roads. Thus, it is also desirable to offer a system that pairs the cyclist to a specific bike during a bike ride for real-time activity tracking.

DETAILED DESCRIPTION

The present teachings relate generally to a system, method and services for tracking, monitoring and pairing cyclists and their bikes. More particularly, a system can monitor, track, and pair one or more cyclist devices and bike devices, detect cyclists accidents and severity of the impact, and accommodate cyclists and bikes of a transportation and repair arrangement service.

In some embodiments, the system can detect an accident that causes injury to the cyclist, damage to the bicycle, or the combination thereof. Types of accidents that can be detected by the system includes, for example, a fall, a collision with a vehicle, a collision with an object such as a tree or a pole, a collision with other cyclists, loss of control, and sliding out.

In an embodiment, the system can be configured to pair a cyclist device with a bike device to track accident detection, damage bike detection, and bike theft detection. The device attached to or carried by the cyclist can be paired to a device attached to the cyclist's bike. The GPS enabled tracking device sends a signal to the paired bike showing the cyclist's location, the bike's location, or both locations. If the cyclist gets separated from his bike due to an accident or if the bike is stolen, the system can help connect the cyclist to his bike. Although the examples provided in the present teachings mainly describes pairing a cyclist with a bike, it will be apparent to those skilled in the art that the present teachings is not limited to this exemplary embodiment. By way of example, pairing of electronic devices in accordance with the present teachings may include any form of transportation, such as a motorcycle, skateboard, or a scooter.

In an embodiment, multiple cyclist devices can be paired with multiple bike devices to form a group of cyclists. The "grouping" feature can be used to pair multiple bikes of cyclists riding in a group. The group can be paired, for example, based on a predetermined distance and/or geolocation. When riding within a group, the system can alert the cyclists of the proximity distance to avoid a crash if a cyclist is riding too closely to the preceding cyclist.

In the event of an accident, the system may be configured to monitor the impact exerted on the cyclist and/or the bike to determine the severity of the accident. In an embodiment, when an accident occurs, the system may be configured to monitor the movement data of the cyclist and/or the bike for a predetermined time period to provide an assessment of the mobility of the cyclist or the bike. If a threshold level of movement has not been exceeded within a predetermined time, or the movement data is suggestive that the cyclist is distressed (such as lying injured horizontally following an accident event), it may be that the cyclist is unable to move (they may be unconscious or injured). An alarm signal may be generated by the accident detection system for alerting a third party that the cyclist is in distress.

The alarm event may be communicated to a third party using an emergency communications link which may connect to signal a family member, other cyclists or member of the emergency services. The alarm signal data may comprise some or all of the accident data and/or may further comprise identification data identifying the user or accident detection system (from which a cyclist may be subsequently determined).

In an embodiment, the present teachings relate generally to a bicycle hailing service and mobile bike repair shop. In an embodiment, the system can be configured to manage the accommodations of cyclists and bikes of a transportation arrangement service. In an embodiment, the alarm event may be communicated to an operator of the transportation services to alert the operator to render aid to the cyclist after an accident. In an embodiment, the system can transport cyclists and bikes and/or repair the bikes when the bike experiences mechanical complications. The system provides a ride hailing service mobile application that connects bicyclists to local drivers who are certified bike mechanics and who own a vehicle that can accommodate and service a bike pick-up request.

Figure 1:
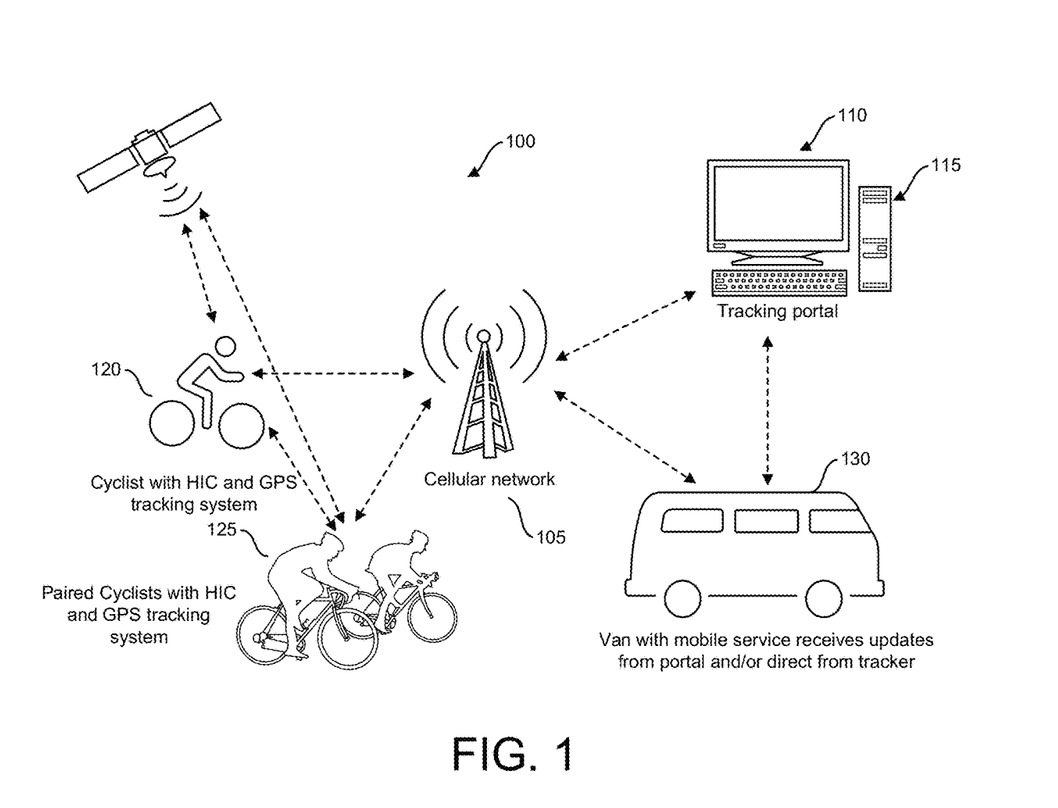
FIG. 1 depicts a representation of a network of data processing systems which employs a system, method and services for tracking, monitoring and pairing cyclists and their bikes in accordance with the present teachings.

FIG. 1 illustrates system 100 for sharing user activity tracker data. System 100 can include tracking portal server 110 communicatively coupled to user device 120 via network 105, which can include the Internet, an intranet, or any other wired or wireless public or private network. User device 120, which can be operated by a cyclist, can be configured to securely transmit the activity tracker data and associated metadata stored on the device to tracking portal server 110 for storage in database 115. According to various embodiments, the user device 120 can function to provide the cyclist with a head injury criteria (HIC) and a GPS tracking system, as shown in FIG. 1.

Specifically, a data processing system according to the present teachings may be implemented as a server, such as tracking portal server 110. The data processing system may include electronic and/or program product and instruction means and data for performing an activity tracker processing. In various embodiments, the data processing system may be described as a personal computer, such as a desktop or portable computer. However, as utilized herein, the terms "data processing system," "computer," and tool can be used interchangeably, and are intended to mean essentially any type of computing device or machine that is capable of running a software product, including communication devices (e.g., pagers, telephones, electronic books, etc.) and other computer-based networked devices (e.g., handheld computers, Web-enabled televisions, home automation systems, multimedia viewing systems, etc.). Those skilled in the art will appreciate that the system and method may be practiced with other computer system configurations, including, for example, hand-held devices, multiprocessor systems, microprocessor-based or programmable consumer electronics, minicomputers, and mainframe computers.

In some examples, the activity tracker data and associated metadata can be transmitted to tracking portal server 110 for storage in database 115 in response to an explicit request for such a transfer by the user of device 120, while, in other examples, the activity tracker data can be synced with the data in database 115 continuously, periodically, intermittently, or at any desired frequency. In yet other examples, the user's activity tracker data can be stored only on user device 120 and may not be stored in an external database.

Figure 7:
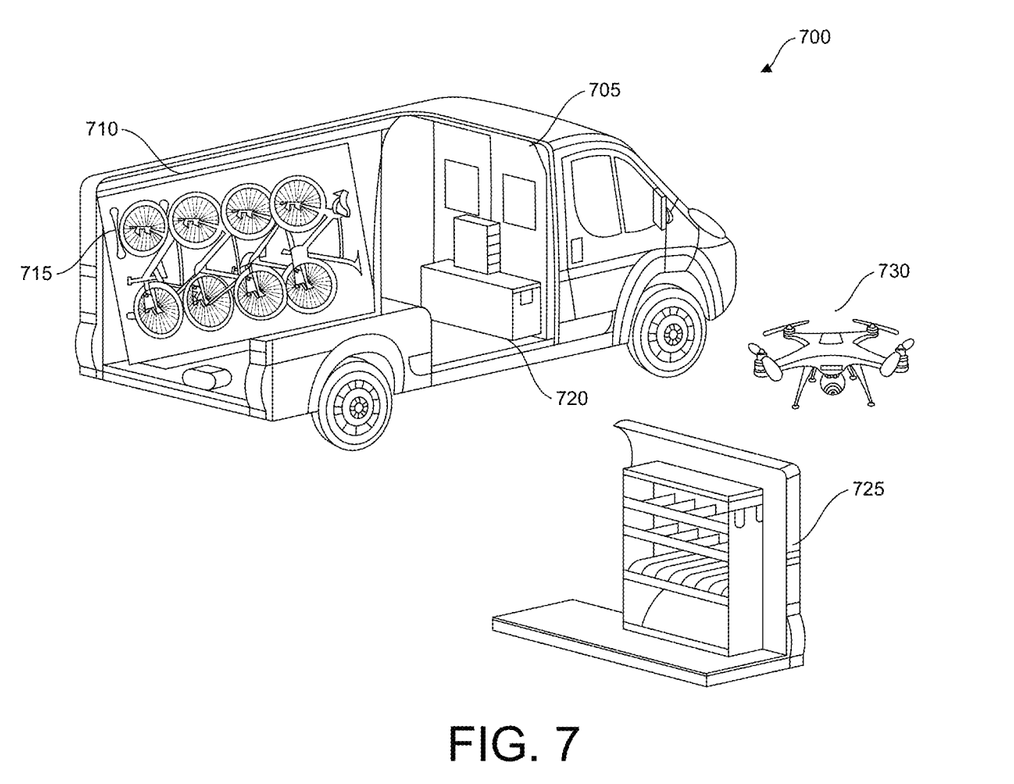
FIG. 7 is an example of a transportation facilitation system for providing transportation arrangement service according to the present teachings.

System 100 can further include any number of other user devices 125 and 130 coupled to network 105. In some examples, user devices 125 can be operated by one or more members of a paired group of cyclists 125, and user device 130 can be operated by the operator of the transport vehicle 705 (FIG. 7). In some examples, activity tracker data can be synced between database 115 and one or more of user device 120, 125 and 130. According to various embodiments, the user device 125 can function to provide each paired cyclist with a HIC and a GPS tracking system, as shown in FIG. 1.

In some examples, any of the above described sources of activity tracker data can be configured to measure, generate, or receive activity tracker data continuously, intermittently, periodically, or at any other desired frequency or interval of time. As such, the activity tracker data can similarly be stored or updated in a user device database or database 115 continuously, intermittently, periodically, or at any other desired frequency or interval of time. The frequencies and intervals of time used for measuring, generating, receiving, or storing activity tracker can be the same or they can be different. Additionally, these frequencies and intervals can be default values or they can be set by a user to provide the user with activity tracker data that has been updated within a desired length of time.

While not shown, it should be appreciated that many other user devices can be coupled to tracking portal server 110 through network 105 to collect and store activity tracker data for other users in a manner similar to that described above.

Figure 2:
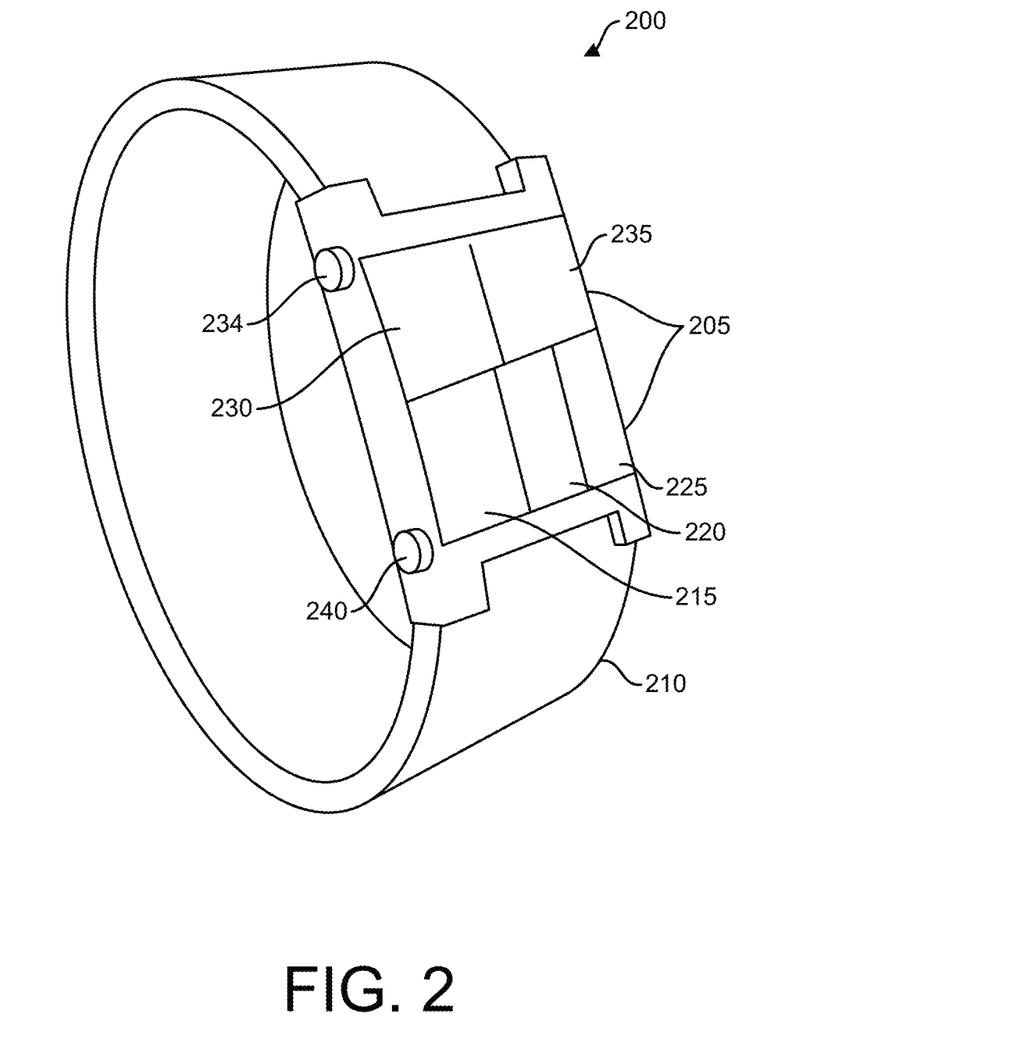
FIG. 2 is a component diagram of an activity tracker device suitable for use with various embodiments of the present teachings.
Figure 3A:
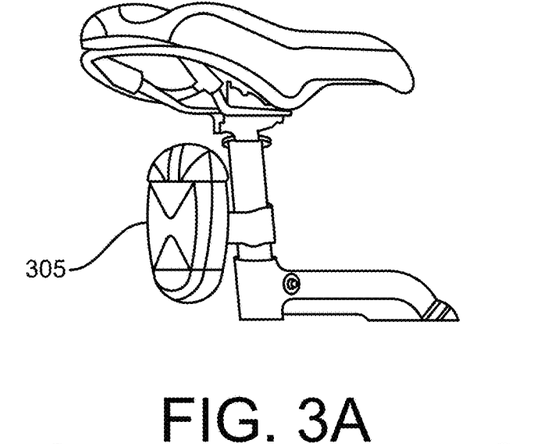
FIG. 3A is another exemplary embodiment of an activity tracker device according to the present teachings.
Figure 3B:
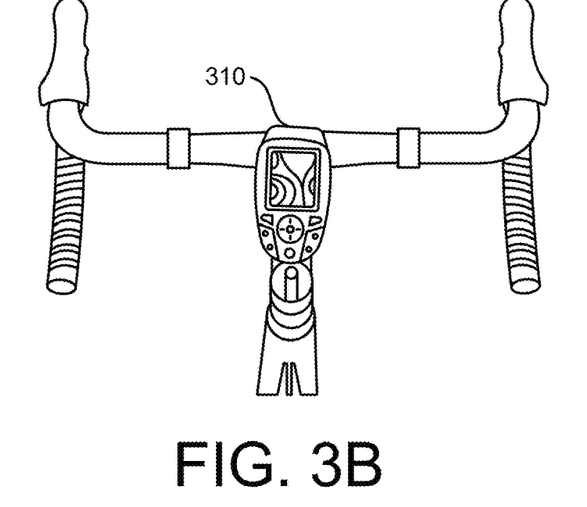
FIG. 3B is another exemplary embodiment of an activity tracker device according to the present teachings.
Figure 3C:
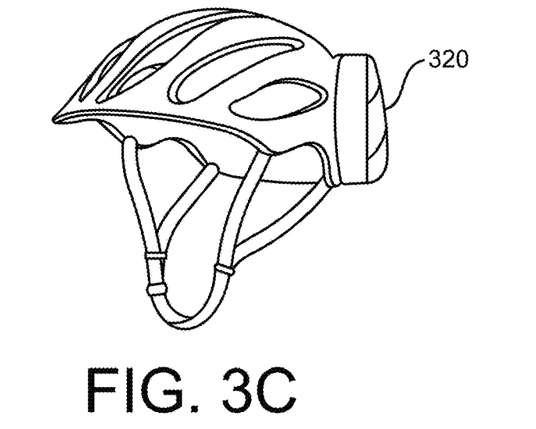
FIG. 3C is yet another exemplary embodiment of an activity tracker device according to the present teachings.

FIG. 2 depicts an exemplary personal electronic activity tracker device 200. Activity tracker device 200 can be any device that can be worn by the user and is capable of receiving activity data from various sources and can store the received data in an internal memory 235, as a user database. FIG. 2 depicts an exemplary embodiment of an activity tracker device as a wristband wireless device 200. Activity tracker device can be any device that can be worn by the user and is capable of obtaining activity data. Non-limiting examples of suitable wearable activity tracker devices are a wristband, wristwatch, bracelet, arm band, ankle band, chest band, necklace, ring, belt, glasses, clothing, hat, headband, earring(s) or visor, or any other wearable item that is capable of obtaining an activity data. The activity tracker device 200 can also be incorporated into clothing, as smart clothing. In another embodiment, the activity tracker device may comprise more than one sensors. Activity tracker device 200 may be arranged to communicate with one or more computers of user devices 125, 130 over a network, such as wireless network 105. Further, activity tracker device 200 may be arranged to communicate with tracking portal server 110, and/or a cloud computing environment over a network.

FIG. 2 illustrates an embodiment where the activity tracker device is a wristband wireless activity tracker device 200. The exemplary activity tracker device 200 may include a display, a band body, a user interface, processor, one or more sensor(s), memory, and/or wireless transceiver which may communicate with a client and/or server. A touch screen display 205 serves as a user interface and is located on the outer side of the band body 210. The activity tracker device 200 may also include an interface for the user to interact with the activity tracker device to receive user inputs. Activity tracker device 200 can include input mechanisms 234 and/or 240. Input mechanism 234 is, optionally, a rotatable input device or a depressible and rotatable input device, for example. Input mechanism 240 is, optionally, a button, in some examples.

The processor 230 may be coupled to an internal memory 235, which are both internal components built and installed within the device 200. The processor 230 may also be coupled to the touch screen display 205. The activity tracker device 200 may include a transceiver (e.g., a Bluetooth® or Zigbee®) for sending and receiving wireless transmissions. The activity tracker device 200 can be configured to receive application and operating system data, using Wi-Fi, Bluetooth®, near field communication (NFC), cellular, and/or other wireless communication techniques.

Activity tracker device 200 can include various sensors for detecting an activity of a user of device 200. Activity sensors can include one or more of any desired type of sensor, such as a GPS sensor, an accelerometer, a directional sensor (e.g., compass), a gyroscope, a motion sensor, other sensor(s), and/or a combination thereof. Other sensor(s) can include any of a pedometer, a passive infrared sensor, an ultrasonic sensor, a microwave sensor, a tomographic motion detector, a camera, a biometric sensor, a light sensor, a timer, or the like. Future models may incorporate implantable sensors that are inserted under the user's skin.

In some examples, device 200 can include software sensor applications (e.g., third party applications) associated with each of sensors for interfacing with the sensors to allow device 200 to receive the activity tracker data. Third party applications and their corresponding sensors can communicate and function within the operating system of device 200 according to a predefined device protocol associated with device 200. The applications can similarly use the device's APIs to access data stored in the database 235. In other examples, user device 200 can be configured to share one or more communication formats with the sensors to allow user device 200 to receive and interpret the activity data from the sensors. The received data can then be stored in the database 235 of user device 200.

In some examples, GPS sensor 225 can be used to determine a user's location and movement, as well as a displacement of the user's motion. An accelerometer, directional sensor, and gyroscope can further generate activity data that can be used to determine whether a user of device 200 is engaging in an activity or is inactive. Activity tracker device 200 can further include a timer that can be used, for example, to add time dimensions to various attributes of the detected physical activity, such as a duration of a user's physical activity or inactivity, time(s) of a day when the activity is detected or not detected, etc.

Activity sensors 215 can be embedded inside of device 200, positioned at any desirable location. In some examples, different activity sensors can be placed in different locations inside or on the surfaces of device 200. In other examples, the activity sensors 215 can be worn by a user separately from device 200. In such cases, the sensors can be configured to communicate with device 200 using a wired or wireless technology. In some examples, activity sensors 215 can be configured to communicate with each other and/or share data collected from one or more sensors.

Impact detection sensor 220 can be embedded inside of device 200 to detect an impact to the user when there is contact between the user or the user's bicycle and an object, such as a vehicle, a pedestrian, or a tree. In some embodiments, the impact detect sensor may be configured to detect the severity of the impact using the head injury criteria (HIC), or HIC score. The HIC score is a measure to assess potential head injury. A lower HIC score indicates a lower risk of injury to the user during a collision. Therefore, in the event of an accident, a low HIC score is desirable.

The HIC formula is represented as:

$$\left\{ (t_2 - t_1) \left[ \frac{1}{t_2 - t_1} \int_{t_1}^{t_2} a(t) dt \right]^{2.5} \right\}_{max}$$

where $t_1$ is the initial time and $t_2$ is the final time and the duration, $t_2$ and $t_1$, is taken so as to maximize the acceleration change over the time period and is not the total duration of impact. Typically, the maximum time duration is $t_2 - t_1 \leq 15$ milliseconds (ms) and a(t) is the resultant translational acceleration at the center of gravity of the head in units of g's (acceleration due to gravity) and t is time in milliseconds.

The HIC levels of injury are as:

Minor Head Injury is a skull trauma without loss of consciousness; fracture of nose or teeth; superficial face injuries.

Moderate Head Injury is a skull trauma with or without dislocated skull fracture and brief loss of consciousness.

Critical head injury is a cerebral contusion, loss of consciousness for more than 12 hours with intracranial hemorrhaging and other neurological signs, recovery is uncertain.

In operations, one or more impact sensors 220 monitor for the amount of force of an impact. One or more impact sensors 220 can be configured to detect a moderate, serious, severe, critical or maximum impacts or collisions. For example, according to the HIC, a HIC score within a range of approximately 520-899 may be indicative of a moderate injury. A HIC score within a range of approximately 900-1254 may indicate a serious injury. A HIC score within a range of approximately 1255-1574 may indicate a severe injury. Injuries above 1575 will exceed the threshold of critical and maximum which may be life threatening.

In some examples, the biometric sensor can include one or more health-related optical sensors, capacitive sensors, thermal sensors, electric field (eField) sensors, and/or ultrasound sensors, such as photoplethysmogram (PPG) sensors, electrocardiography (ECG) sensors, and/or galvanic skin response (GSR) sensors. These sensors can generate data providing health-related information associated with the user. For example, PPGsensors can provide information regarding a user's respiratory rate, blood pressure, and/or oxygen saturation. ECG sensors can provide information regarding a user's heartbeats. GSR sensors can provide information regarding a user's skin moisture indicative of sweating and can prioritize a thermostat application to determine a user's body temperature. Using one or more of these sensors, activity tracker device 200 can determine physiological characteristics of the user while performing a detected activity, such as a heart rate of a user associated with the detected activity, average body temperature of a user detected during the detected activity, any normal or abnormal physical conditions associated with the detected activity, or the like.

The activity tracker device 200 may also include a stimuli unit for applying a stimulus to a user wearing the device 200. The stimuli unit can be located on the inner side of the band body 210 to apply one or more stimuli directly to the user's skin. In other embodiments, the stimuli unit may not be in direct contact with the user's body. In various embodiments, different stimuli may be selected, the intensity adjusted, and applied to user. These stimuli may be combined or applied individually according to a predetermined order. In some embodiments, the stimuli may be applied to a plurality of different body parts of the user. The activity tracker device 200 may include a battery or may be rechargeable.

Memory 235 of activity tracker device 200 can be a non-transitory computer-readable storage medium, for storing computer-executable instructions, which, when executed by one or more computer processors 230, for example, can cause the computer processors to perform the techniques described above, including processes. The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. Activity tracker device 200 is not limited to the components and configuration of FIG. 2, but can include other or additional components in multiple configurations.

Device 200 can further include one or more computer processors 230 coupled to memory 235. For example, processors 230 can be coupled to provide instructions to activity sensors 215 and can be coupled to receive activity data from activity sensors 215.

Processors 230 can be configured to process the activity data to determine if the physical activity data represents a physical activity being performed by the user, where a physical activity can generally refer to any bodily motion that can enhance or maintain physical fitness and overall health and wellness. Additionally, processors 230 can be configured to identify the type of physical activity represented by the activity data, such as whether the detected activity is standing, bicycling, jogging, walking, running, swimming, jumping, going up stairs, intense bodily movements, or the like. Some algorithms can instruct processor 230 to recognize movement of device 200 as being associated with an activity if the detected movement has an intensity level greater than or equal to a physical activity threshold. The physical activity threshold can be represented as a distance traveled, a number of Calories burned, a number of steps taken, any one or more of these attributes calculated per unit time, or the like. The algorithms for storing such instructions for the one or more processors 230 can be stored in memory 235.

Additionally, processors 230 can determine, based on the physical activity data received from the sensors, various attributes of the detected physical activity. Attributes of the detected physical activity can include physical, biological, physiological, or environmental characteristics associated with the detected physical activity. Examples of attributes determinable by device 200 upon detecting a physical activity can include, but are not limited to: duration of the detected physical activity; time(s) of a day when the user performs the detected physical activity; distance traveled by a user of the device while performing the detected physical activity; elevation climbed by a user of the device while performing the detected physical activity; an average velocity of a user of the device while performing the detected physical activity; an average heart rate of a user of the device while performing the detected physical activity; or the like.

In some examples, device 200 can receive an input from a user indicating that he/she is engaging in a particular type of activity that causes them to move at a velocity exceeding a threshold (e.g., cycling), and that the associated movement should be interpreted as being a result of exercise.

As depicted in FIGS. 3A-3C and 4, in some examples, the user may use one or more different activity tracker devices that can be placed in different locations—e.g., some devices 300, 320 worn by the user and some attached to the bike 305, 310, or the like. In some examples, user device 300 can be a device similar or identical to device 200, described above. In this example, user device 300 is a wristband wireless activity tracker device as described above with regards to user device 200. In such cases, the activity tracker devices 305, 310, and 320 can be configured to communicate with activity tracker device 300 using a wireless technology. In some examples, devices 300, 305, 310, and 320 can be configured to communicate with each other and/or share data collected from one or more sensors.

In some embodiments, user devices 305, 310, and 320 can have some similar configurations, functionalities, and some possible variations in comparison to device 200 as explained above in reference to the example of FIG. 2. In some examples, user devices 305, 310, and 320 can be configured to obtain any of the above described sources of activity data to measure, generate, receive, or collect and store activity data continuously, intermittently, periodically, or at any other desired frequency or interval of time in a manner similar to that described above.

Figure 4:
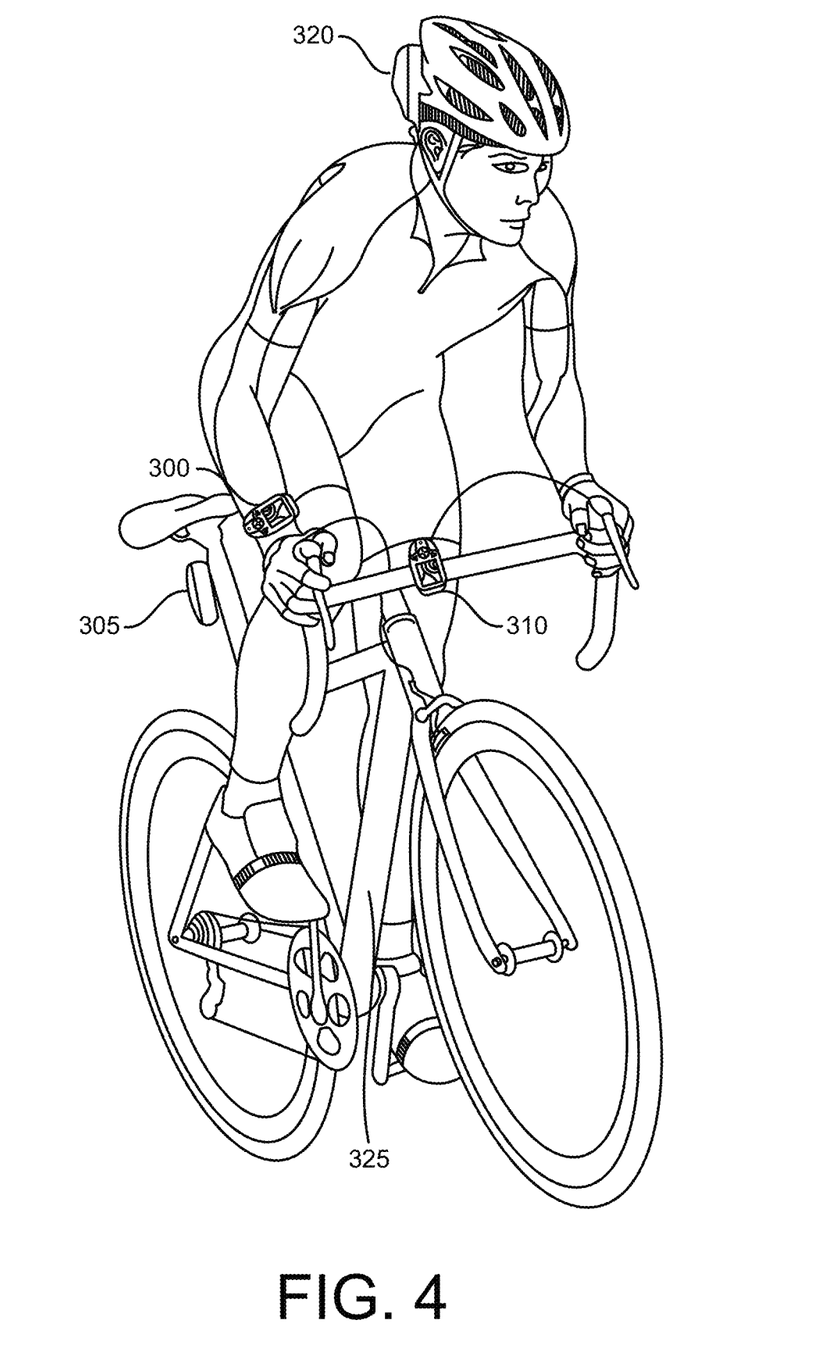
FIG. 4 depicts an exemplary embodiment of various activity tracker devices in use by a cyclist during a bike ride according to the present teachings.

In FIG. 4, in an example, device 300 can be a wristband wireless device similar to device 200. In an example, device 305 can be attached to the seat post as a GPS taillight. In some embodiments, device 320 can be attached to the user's helmet with a GPS light, a helmet camera, or a combination thereof. An impact detection sensor 220 can be embedded within one or more devices 305, 310, and 320.

In some embodiments, device 310 can be attached to the handlebars of bicycle 325 and configured to include a display a touch screen display 205 that serves as a user interface for the user to interact with the activity tracker device to receive user inputs.

In some embodiments, a navigation application dynamically generates instructions for a user device 310 for presentation to the cyclist. The navigation application of some embodiments adaptively generates directional graphical indicators for presentation to the cyclist to alert the cyclist of one or more approaching vehicles. In some embodiments that use this approach, a vehicle approaching from the right can be represented and display on device 310, for example, by a right arrow. Similarly, a car approaching from the left can be represented, for example, by a left arrow, a car approaching from the back of the cyclist can be represented, for example, by an upward arrow, and a car approaching towards the cyclist can be represented, for example, by a downward arrow. In addition, the direction indicator may be made to blink in some embodiments to indicate the speed of the approaching vehicle. In some embodiments, through the use of the proximity sensor, the system can alert the cyclist of a high speeding approaching car by displaying on device 310 a warning that states, for example, "high speed driver getting closer than 6 ft".

In an embodiment, the system can be configured to pair a cyclist device with a bike device, for example, using two or more devices 300, 305, 310, 320, to track accident detection, damage bike detection, and bike theft detection. The device(s) 300, 320 attached to or carried by the cyclist can be paired to a device 305, 310 attached to the cyclist's bike. The GPS enabled tracking device sends a signal to the paired bike showing the cyclist's location, the bike's location, or both locations. If the cyclist gets separated from his bike due to an accident or if the bike is stolen, the system can help the cyclist locate the bike.

During the pairing operation, one device may be designated as the primary device. The system can enable multiple device connections simultaneously to pair to the primary device. In some embodiments, three or more devices can be paired together employing, for example, Bluetooth® multipoint.

In some embodiments, two or more devices (e.g., devices 200, 305, 310, 320) can be paired with each other to detect the occurrence of an accident and the severity of the impact based, for example, on the HIC score, suffered by the cyclist and/or the bicycle as a result of the accident.

In operation, the system includes one or more sensors for detecting characteristics of an accident, and for generating corresponding signals, processing means for analyzing the signals from the one or more sensors using an accident detection algorithm to determine if an accident has occurred. The system tracks the signals from the accelerometer and determine if an accident, such as a fall, has occurred. The combination of a high impact value detected by impact detection sensor 220 in which the acceleration signal exceeds a predetermined threshold, followed by a period of relatively constant acceleration, for example gravity only, since the user may be lying motionless on the ground. In addition, gyroscopes and/or magnetometers can be used to measure the body's orientation to check for a sustained non-vertical position in evaluating whether an accident has occurred.

Figure 5:
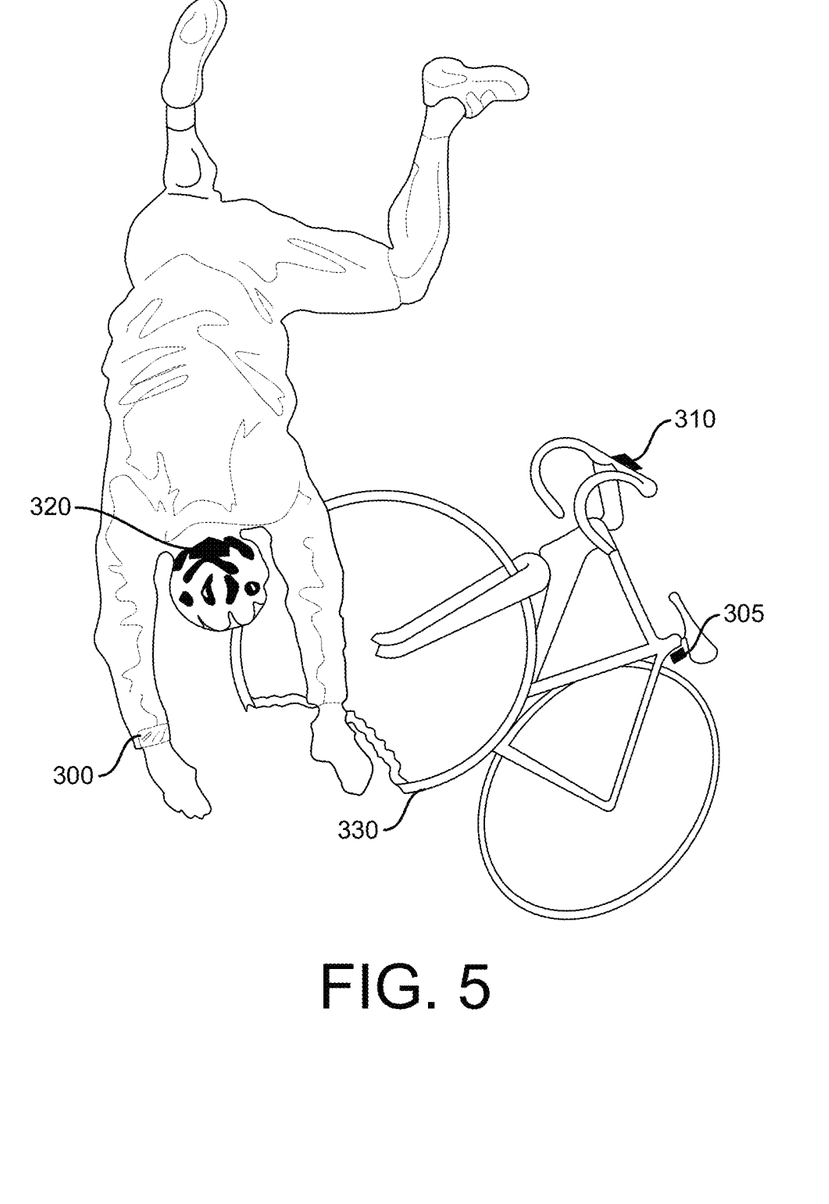
FIG. 5 depicts an exemplary embodiment of various activity tracker devices in use by a cyclist during a bike accident according to the present teachings.

As illustrated in FIG. 5, the system can be configured to detect the signals from multiple devices 300, 305, 310, 320, and simultaneously analyze the combination of signals from the multiple devices to determine if an accident has occurred and the severity of the accident. In the event the cyclist suffers a crash and is thrown a distance from the bike 325, using the accident algorithm and the signals detected from the combination of devices 300, 305, 310, 320, the system can determine if there is a possible injury to the cyclist and/or the bike. The distance from the collision point to the final position of the cyclist is defined as the throwing distance. The system can be configured to detect multiple contact interactions for the cyclist and the bike during a crash. For example, in a bike and car collision, the impact detection sensor(s) may be used to detect multiple contact interactions, such as, the cyclist with the car and the pavement/road; and the bike with the car and the pavement/road. For high velocity bike and car crashes, the cyclists may clear the roof, landing at the back of the car. For lower velocity bike and car crashes, the cyclist may be carried on the hood of the car for a longer duration before rolling off. The system can be configured to detect each of these contact interactions and calculate the amount of impact to determine whether the cyclist has suffered an injury and, if so, the severity of the injury.

In an example, when the cyclist is thrown off the bike, the system can detect the impact of the crash and the distance using GPS sensor(s) 225 from which the cyclist was thrown from the point of impact and the distance from the bike to detect the severity of the crash. If the cyclist is separated by a predetermined distance as a result of the crash, the system can determine that this separation distance is an indication of severe crash. If the impact detected by the helmet sensor 320 exceeds a predetermined threshold based, for example, on the HIC Formula, the system can determine the severity of the impact to the cyclist. In an example, if the system detects an impact to the helmet sensor 320 that exceeds a predetermined threshold, for example, on the HIC Formula, the system can determine that the cyclist has suffered a severe impact and/or with possible head injuries. In an example, if the crash damages the bike, for example, causing a broken wheel 330, the impact detected by the sensors 310, 305 attached to the bike can indicate a severe impact to the bike.

In an embodiment, the system can detect and analyze the same set or a different set of signals at each device 300, 305, 310, 320. Using the accident algorithm, the system can automatically rank the signals for the accident characteristics detected by each device. The system then can combine the ranking of the accident characteristics for each device to determine if an accident has occurred and the severity of the accident. The accident characteristics can include one or more attributes detected by one or more sensors described herein. In an bike and car collision example, if the car initially hits the bike causing the cyclist to be thrown from the bike, the initial contact between the bike and the car may be detected by device(s) 305 and/or 310 as having the highest impact detection value while device(s) 320 and/320 may detect the highest throw distance value.

Figure 6:
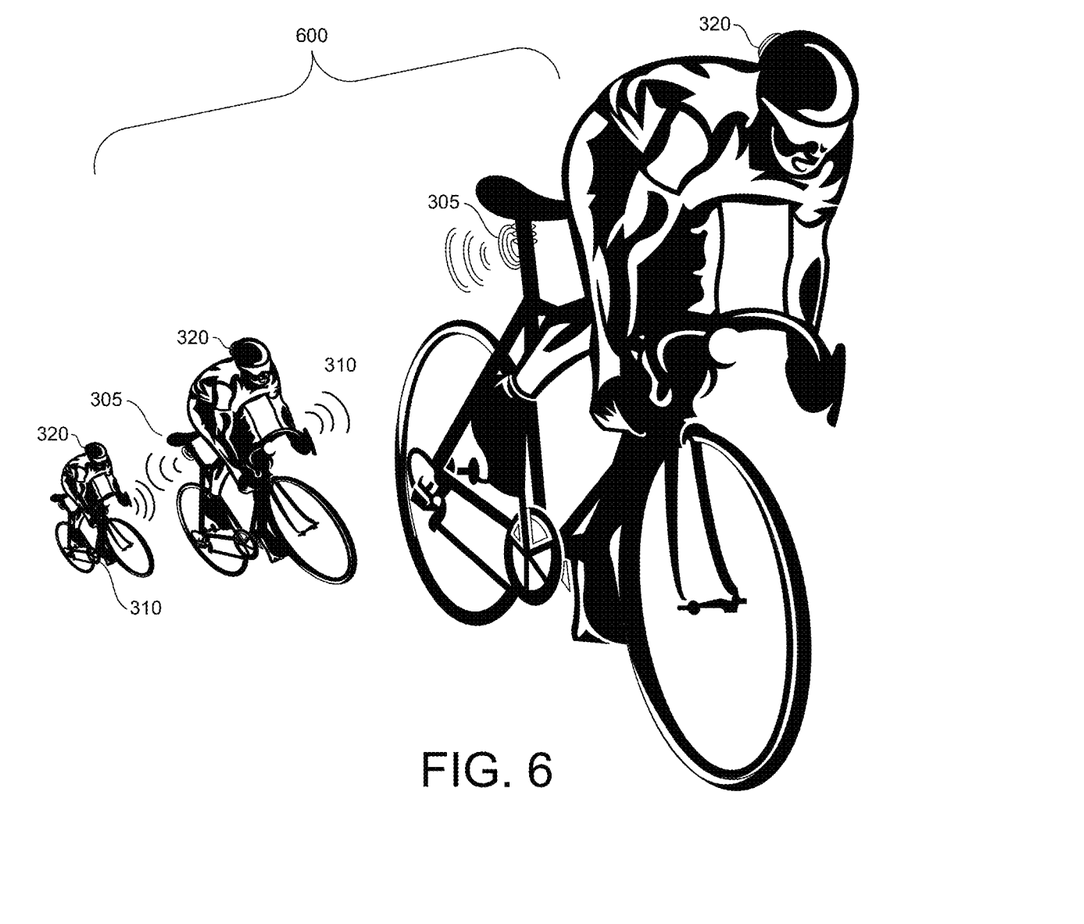
FIG. 6 is an exemplary embodiment of pairing multiple activity tracker devices according to the present teachings.

In an embodiment shown in FIG. 6, multiple cyclist devices can be paired with multiple bike devices 305, 310, 320 to form a group 600 of cyclists. The "grouping" feature can be used to pair multiple bikes of cyclists riding in a group. Multiple bikes can be paired to join a group by the activation of each user, for example, based on a predetermined distance and/or geolocation. Using the user interface of his or her device(s), the user can enter instructions to join the group when his or her bike is detected to be within a predetermined distance within a range of, for example, 0.5 mile to 1 mile, from the group.

The system can monitor parameters of the bikes within the group, for example, distance between the preceding bike, each bike's speed and wheel rotation, etc. A pairing relationship can be established between the devices 305, 310, 320 by detecting the proximity of other devices using a proximity sensor which may be one of transmitting sensors and/or receiving sensors. The transmitting sensors and/or receiving sensors may use GPS sensor 225 to compare its GPS coordinates to coordinates of the other devices that have been paired. In an embodiment, the devices can be paired in tandem, such that each device is paired to the preceding device. When riding within a group, the system can alert the cyclists of the proximity distance to avoid a crash if a cyclist is riding too closely to the preceding cyclist.

When riding in a group in a substantially tandem riding formation, the system can be configured to enable the group to engage in drafting. One benefit of riding in a group is experiencing the benefit of drafting by effectively riding in a paceline. Drafting occurs when a cyclist moves into an area of low pressure behind another cyclist, reducing the wind resistance and the amount of energy required to pedal. Over the course of a ride, every cyclist in the group can experience drafting benefits by rotating the lead rider to the back of the pack, or riding in a paceline. Doing this correctly can reduce the amount of effort each cyclist is putting in by 30%. This results in the group going farther and faster.

To get the maximum benefit in a paceline, the cyclists should keep their wheels as close as possible to the preceding bike. The system can employ a drafting algorithm to calculate and inform each cyclist of the optimal distance between each bike and to determine the frequency of rotation of the lead cyclist. For example, the system parameters can set the optimal distance to be within a range, for example, of 10 cm-40 cm from the wheel of the preceding cyclist. The system can calculate in real-time the distance between the cyclists and inform each rider to increase speed, decrease speed or maintain speed to achieve the optimal distance. The system can also be configured such that the predetermined frequency of rotation of the leading cyclist is within a range of approximately 0.5 miles to 1 mile. Notification of the frequency of rotation can alert the current lead cyclist and the subsequent cyclist of the time remaining in the rotation. In addition, the system can be configured to detect the wind direction and its impact on the group's drafting.

A cyclist can configure his or her device to unjoin the group by activation of the user, based on a predetermined distance, geolocation, or a combination thereof. In an example, to unjoin the group, the cyclist can simply travel outside of the predetermined distance or geolocation of the group and the system will automatically disconnect the cyclist's devices from the group.

In the event of an accident, the system may be configured to monitor the impact exerted on the cyclist and/or the bike to determine the severity of the accident. In an embodiment, when an accident occurs, the system may be configured to monitor the movement data of the cyclist and/or the bike for a predetermined time period to provide an assessment of the mobility of the cyclist or the bike. If a threshold level of movement has not been exceeded within a predetermined time, or the movement data is suggestive that the cyclist is distressed (such as lying injured horizontally following an accident event), it may be that the cyclist is unable to move (they may be unconscious or injured). An alarm signal may be generated by the accident detection system for alerting a third party that the cyclist is in distress.

The alarm event may be communicated to a third party using an emergency communications link which may connect to signal a family member, other cyclists or member of the emergency services. The alarm signal data may comprise some or all of the accident data and/or may further comprise identification data identifying the user or accident detection system from which a cyclist may be subsequently determined.

In an embodiment, the present teachings relate generally to a bicycle hailing service and mobile bike repair shop, as depicted in FIG. 7. In an embodiment, the transportation facilitation system 700 can be configured to manage the accommodations of cyclists and bikes of a transportation arrangement service. In an embodiment, the alarm event may be communicated to an operator of the transportation services to alert the operator to render aid to the cyclist after an accident. In an embodiment, the system can transport cyclists and bikes and/or repair the bikes when the bike experiences mechanical complications. The system provides a ride hailing service mobile application that connects bicyclists to local drivers who are certified bike mechanics and who own a vehicle that can accommodate and service a bike pick-up request.

Figure 8:
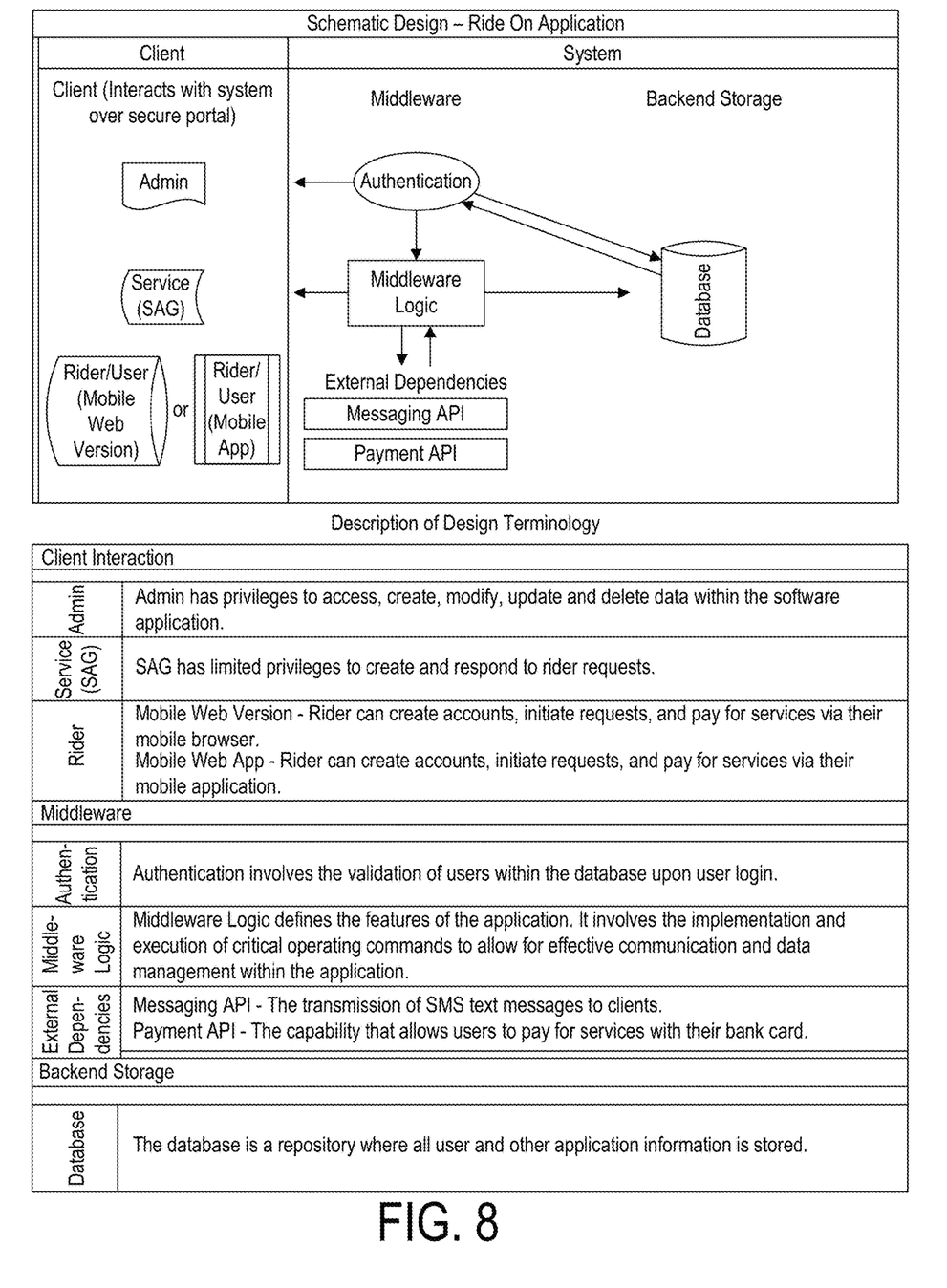
FIG. 8 is a block diagram illustrating an example transport facilitation system of FIG. 7 according to the present teachings.

As shown in FIG. 8, in certain aspects, a transportation facilitation system can create cyclist profiles that specify the cyclist's type of bike(s), and vehicle profiles indicating both transport and repair accommodation features for the specified type of bike. The transport facilitation system 700 can receive a pick-up request, utilize the cyclist profile and vehicle profiles of vehicles proximate to a pick-up location, select a vehicle to service the pick-up request, and generate a configuration set to configure the selected vehicle to accommodate the cyclist and bike.

The transport facilitation system 700 can accommodate cyclists as passengers with their bikes by selecting transport vehicles that include certain capacity, bike racks, and repair capabilities. For example, as shown in FIG. 7, the transport vehicle 705 may be configured including passenger seats (not shown), a repair station 725, and multiple bike racks 715. In some embodiments, the transport vehicle 705 can be configured as a van or a truck. In one or more examples, the transport can be an autonomous vehicle (AV) or self-driving vehicle (SDV). The terms "AV" or "SDV" as used herein refers to any vehicle which is operated in a state of automation with respect to steering and propulsion. Different levels of autonomy may exist with respect to AVs and SDVs. For example, some AVs and SDVs can drive without any human assistance from within or external to the vehicle. Other vehicles may enable automation in limited scenarios, such as on highways, provided that drivers are present in the vehicle.

The transport vehicle 705 can be configured to provide accommodations for several passengers along with their bikes 710. The transport vehicle 705 can be equipped with safety equipment that provides secure bike storage, such as bike racks 715, to prevent injuries, which can be caused by unsecured bikes and to prevent damage to the bikes. The transport vehicle 705 can be installed with a variety of racks suitable for many different types of bikes including e-bikes, road bikes, mountain bikes, fat bikes, and bikes with or without fenders. The bike racks can be positioned in various locations within the cargo area of the van transport vehicle, such as being side-panel mounted vertical bike racks. The bike can be loaded onto the transport vehicle and fit snugly into a bike rack, such as Steadyrack™, so there is virtually no risk of the bikes falling over or falling out of the racks making them safe and secure. The racks 715 can be designed to pivot or swing relative to the wall mounted thereon so that multiple bikes can be stored at an angle closely together to avoid damaging adjacent bikes.

Among other benefits, the transport vehicle 705 can be configured to include bike repair tools and equipment 720 to provide bike repair services. The bike repair services offered can include, for example, but not limited to, safety check, flat tire repair (includes tires with air, patch or inner tube replacement), lube necessary parts, chain repair, brake adjustment, resurface or adjust brake pad or rotors, adjust shifting, adjust derailleur cables, adjust loose bearing, and e-bike battery charge.

In certain implementations, the transport vehicle 705 can be designed to include a self-diagnostic repair stations for e-bikes. The transport vehicle can provide diagnostic inspection service similar to car diagnostic services. The system includes a system detection tool and Bluetooth® transmission module. It can help the transport driver or bike technician to resolve bike problems quickly and accurately. The system can record inspection and maintenance results, and cyclist data for repair history. The diagnostic system can diagnose the e-bike system automatically via Bluetooth®, including the electric motor components such as the battery, motor and controller. The system can build a wireless connection with the e-bike via the computer software and Bluetooth® and provides the inspection service automatically. The system can generate a diagnosis report automatically to check the e-bike's system status and problems. In some embodiments, the system can generate a tutorial for troubleshooting after diagnosis. The system automatically detects whether problems have been fixed during the troubleshooting process. The system can perform error diagnosis for electrical control components, for example, Human Machine Interface (HMI), controller (including button signal, monitor display, communication), driver, sensor, and motor (including speed, torque, cadence, booster, communication and light signal).

To address minor medical needs of the cyclists, the transport vehicle can be equipped with first aid kits, blankets, and snacks for nourishment.

In some examples, a mobile computing device is provided that executes a designated transportation service application that accommodates the cyclist in connection with the transportation arrangement service based on the cyclist's type of bike(s). In addition to enabling the cyclist to transmit a bike pick-up request for transportation from a pick-up location to a particular destination, the mobile computing device can generate a user interface to enable the cyclist to input one or more certain service requirements or preferences (e.g., standard pick-up locations, vehicle feature requirements, etc.). In various implementations, the designated application can cause the mobile computing device to perform various functions to assist the cyclist in connection with the transportation arrangement service.

For example, the mobile computing device can track and monitor all or selected aspects of the cyclist's activities as the cyclist rides his bike. Additionally, or alternatively, the mobile computing device can generate a control interface to enable the cyclist to select various tracking and monitoring features, such as turn on a location beacon to share the cyclist's location in real time with others in case of an emergency, activate a video capture device to record, digitally archive, and share videos and other tracking activities. The video capture device includes a camera that functions as an image/video recording device, which can be integral or a separate component. The video capture device can include a microphone and user control device. The microphone can receive audio signals and, for example, relay them to the video recording device for recording along with captured video and send the captured information to the transport facilitation system. In certain scenarios, the camera can be designed to be multi-purpose by allowing it to be easily attachable to multiple surfaces. For example, the camera can be removably attached to the cyclist's helmet and/or the bike frame. The camera can be configured to sit atop any helmet type.

The video capture device can comprise one or more image sensors oriented to detect directional information as the cyclist rides. The various image sensors may be communicatively coupled to the image recording device via a multi-channel cable. In an alternative embodiment, the image sensors may be coupled to a wireless transmitter for wireless transmission of video data. The device can be configured to store video signals that are received simultaneously from the multiple image sensors in an appropriate format for replaying such video. Information indicating a time that video frames are captured is recorded, so that the video feeds remain appropriately correlated in time. In a further embodiment, the device may be programmed to periodically capture images from the image sensors on the helmet camera.

In an embodiment, the system uses the camera to record the cyclist's trip, road location and store the information into the device and upload the information to the cloud for processing together with GPS coordinates. Time of day and weather conditions may also be recorded to ensure detailed information regarding the cyclist's trip.

In case of an emergency, the tracking, monitoring, and video storing features enables the system to readily locate the cyclist's location. Even while riding on back roads or rural roads, the system can help to record and store information regarding the cyclist's ride. The information can be quickly retrieved to recreate the cyclist trip should the cyclist go missing.

Exemplary complimentary equipment that may be utilized in connection with the illustrated embodiment comprises, but is not limited to, a beacon/transmitter, a Global Positioning System (GPS) locator, or a radio signal communications apparatus. One or more beacon/transmitter(s) can be worn close to the cyclist's body and/or attached to the bike to continuously emit a radio signal that can be picked up by other transceivers in an area. Companions or searchers with transceivers can switch to "search" mode to locate a missing cyclist's signal. The beacon/transmitter can include an automatic "send" feature. This function automatically switches the transceiver to send mode if the cyclist does not return to his destination within a specified time.

Further, drone technology can be incorporated as a component of the system. For example, a drone 730 can be deployed from the transport vehicle 705 to locate a missing cyclist or bike. An application server of the system may use the recorded location data to generate a travel path. An operator controlling the drone 730 via a remote control device may guide the drone, and it may be directed to the cyclist's location via autonomous methods. The application server may transmit the travel path to the drone wirelessly. The location information and travel path may be continuously updated. The drone may use the travel path to navigate to the cyclist's or bike's location. The drone 730 may communicate with the cyclist using audio or visual communication, and may deliver rescue supply materials to the cyclist, if carried by the drone.

FIG. 8 is a block diagram illustrating an example transport facilitation system 700 in communication with user devices and a fleet of transport vehicles, as described herein. The transport facilitation system 700 can include a communications interface to communicate with the user devices and the fleet of available transport vehicles over a number of networks. In addition, or in variations, the transport facilitation system can communicate with human drivers that are skilled bike mechanics operating transport vehicles, via driver devices, to facilitate transportation in accordance with a transportation arrangement service managed by the transport facilitation system.

In many examples, the transport facilitation system can provide the transportation arrangement service to link requesting users with transport vehicles and/or AVs or SDVs in the transport vehicle fleet managed by the transport facilitation system. The human-driven vehicles, AVs, or SDVs may be vehicles managed by the transport facilitation system or vehicles owned by third-party entities that are available to service bike pick-up requests.

A designated application corresponding to the transportation arrangement service can be executed on the user devices. A requesting user can provide an input on a user device to transmit a bike pick-up request to the transport facilitation system. The bike pick-up request can be received by the communications interface and sent to a selection engine, which can match the requesting user with a proximate transport vehicle, in relation to a pick-up location, from the fleet of available vehicles.

Whether cyclists, as the user of the system, need airport transportation, or other local transportation with their bikes, the application makes it easy and convenient for cyclists to use the hailing service to return home or to book reservations to travel to a particular destination. In one or more examples, the bike pick-up request can include a pick-up location where a selected transport vehicle can meet the requesting user. The fleet of available vehicles can be dispersed throughout a predetermined geographical region (e.g., a city or a regional area) and transmit vehicle location data to a vehicle interface of the transport facilitation system. The vehicle interface can transmit the vehicle locations to the selection engine in order to enable the selection engine to determine candidate vehicles that can readily service the bike pick-up request.

As used herein, a computing device refers to devices corresponding to desktop computers, cellular devices or smartphones, personal digital assistants (PDAs), laptop computers, tablet devices, virtual reality (VR) and/or augmented reality (AR) devices, wearable computing devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with the figures provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as those carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

Moreover, it will be recognized that various alternatives, modifications, variations, or improvements of the above-disclosed exemplary embodiments and other features and functions, or alternatives thereof, may be desirably combined into many other different embodiments, systems, or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the exemplary embodiments contained herein.

What is claimed is:

1. A transport and repair vehicle communication system for providing a bicycle hailing service and mobile bike repair shop, the system comprising:
   a first biker activity tracker device attached to a biker's body;
   a second biker activity tracker device attached to the biker's helmet to detect biker activity data;
   wherein the first biker activity tracker device is in communication with the second biker activity tracker device;
   wherein the second biker activity tracker device includes:
      a first impact detection sensor configured to detect a first impact to the biker when there is contact between the biker and one or more objects;
      a first GPS sensor configured to determine a first location and movement of the biker;
      a gyroscope sensor configured to measure an orientation of the biker's body; and
      a biometric sensor configured to be in contact with the biker to acquire biological information of the biker;
      a first communication interface configured to communicate with a transportation facilitation system;
      a first memory configured to store first impact information of the biker, the first location and movement information of the biker, the orientation information of the biker's body and the biological information of the biker; and
      a first processor coupled to the first memory and wherein the first processor is configured to execute, according to one or more first commands, instructions to receive, process, and respond to the information from the first impact detection sensor, the first GPS sensor, the gyroscope sensor, and the biometric sensor; and a first bicycle activity tracker device attached to a bicycle;

a second bicycle activity tracker device attached to the bicycle to detect bicycle activity data;

wherein the first bicycle activity tracker device is in communication with the second bicycle activity tracker device;

wherein the second bicycle activity tracker device includes:
- a second impact detection sensor configured to detect a second impact to the biker's bicycle when there is contact between the biker's bicycle and the one or more objects; and
- a second GPS sensor configured to determine a second location and movement of the bicycle;
- a second communication interface configured to communicate with the transportation facilitation system and wherein the second communication interface, the first communication interface, and the transportation facilitation system are configured to be in communication with each other;
- a second memory configured to store second impact information of the bicycle and second location and movement information of the bicycle; and
- a second processor coupled to the second memory and wherein the second processor is configured to execute, according to one or more second commands, instructions to receive, process, and respond to the information from the second impact detection sensor and the second GPS sensor;

a database storing profiles indicating setup preferences for a plurality of bikers enrolled as users of a transportation arrangement service and at least one type of bicycle associated with each biker;

one or more transportation facilitation system processors; and one or more memory resources storing instructions that, when executed by the one or more transportation facilitation system processors, cause the transportation facilitation system to:
- pair the first biker activity tracker device with the first bicycle activity tracker device;
- receive a bicycle pick-up request from a user device, which is either the first biker activity tracker device or the first bicycle activity tracker device, running a designated application of the transportation arrangement service, the bicycle pick-up request comprising a pick-up location, a number of passengers, bicycle specification information, bicycle transport accommodations, bike repair services, and accident occurrence information; and wherein the one or more transportation facilitation system processors determines the accident occurrence information by:
- calculating, using an algorithm, a separation distance value to indicate a distance of the biker and the bicycle relative to each other based on signals from the first GPS sensor and the second GPS sensor; and
- tracking and monitoring in real-time movement, position, and orientation of the second biker activity tracker device and the second bicycle activity tracker device to determine an occurrence of an accident and a severity of the accident based on the biker activity data, the bicycle activity data, the separation distance value, and a Head Injury Criterion (HIC) score.

2. The transport and repair vehicle communication system according to claim 1, wherein:
the first biker activity tracker device includes the second biker activity tracker device; and
the first bicycle activity tracker device includes the second bicycle activity tracker device.

3. The transport and repair vehicle communication system according to claim 1, wherein the one or more transportation facilitation system processors are further configured to determine when the user engages in an activity or is inactive based on at least one of the biker activity data and the bicycle activity data.

4. The transport and repair vehicle communication system according to claim 3, wherein at least one of the second biker activity tracking device and the second bicycle activity tracker devices includes one or more of an accelerator, a directional sensor, a motion sensor, a pedometer, a passive infrared sensor, an ultrasonic sensor, a microwave sensor, a tomographic motion detector, a camera, a light sensor, a timer, and an implantable sensor configured to be inserted under the user's skin.

5. The transport and repair vehicle communication system according to claim 1, wherein the one or more transportation facilitation system processors are further configured to execute a grouping feature command to pair multiple biker devices with multiple bicycle devices to form a group of bikers.

6. The transport and repair vehicle communication system according to claim 5, wherein the one or more transportation facilitation system processors are further configured to form the group of bikers based on at least one of a predetermined distance and a predetermined geolocation of the second biker activity tracker device and the second bicycle activity tracker device.

7. The transport and repair vehicle communication system according to claim 6, wherein the one or more transportation facilitation system processors are further configured to determine a pairing relationship between the multiple biker devices based on a riding distance between each bicycle, a speed of each bicycle and a wheel rotation of each bicycle.

* * * * *